3,022,185
WHITE FILLER MATERIAL AND ITS PREPARATION

Pierre Delfosse, % S.A. Du Blanc Omya, 31 Rue Cambaceres, Paris, France
No Drawing. Filed Feb. 10, 1958, Ser. No. 714,070
Claims priority, application France Sept. 2, 1957
14 Claims. (Cl. 106—296)

The present invention relates to filler materials, such as used in the paint and plastic industries, for instance, and more particularly to the manufacture of perfectly white fillers having such a high hiding power that finished products of beautiful clear and fresh colors may be obtained therewith.

If a paint or plastic composition, for instance polyvinyl chloride or a polyester resin, contains about 20–40% of filler, the degree of whiteness of the filler has an important bearing on the tint or color of the finished product. It is, of course, impossible to obtain a pure white product with a filler which is not itself perfectly white.

Pure white fillers can be obtained only from raw materials which contain little or no iron or other metallic impurities. Such raw materials are either purified or chemically prepared substances, such as for instance precipitated calcium carbonates or natural materials of exceptional purity. However, these sources of raw material have the following disadvantages:

(1) Chemically prepared substances are too expensive for commercial use and also have a very high oil absorption coefficient.

(2) Very pure natural materials (alkali earth silicates, carbonates and sulfates) always have a crystalline structure and are, therefore very hard. This presents a serious problem when the materials are to be crushed or comminuted to produce the filler and also makes the filler highly abrasive. Furthermore, the natural crystalline materials have a very weak hiding power.

It is a principal object of the present invention to provide a perfect white filler.

It is another object of this invention to provide such a filler which has other properties of great usefulness in the paint or plastic industries, for instance.

It is a further object of the invention to provide simple and rather inexpensive methods and means for obtaining a filler of high quality.

Particulate mineral fillers should desirably have the following properties:

(1) They should be very fine and, for most uses, the average diameter of the filler particles should be between about one and 6–7 microns.

(2) They should be perfect white, approaching as closely as possible the whiteness of chemically pure carbonate of magnesium, which is considered as the test of whiteness.

(3) The oil absorption should be as low as possible.

(4) The hiding power should be as high as possible although it is not necessary that the fillers attain the values of highly refractive pigments.

The fillers obtained by the methods of the present invention have the above properties to a large degree.

In accordance with the invention, comminuted mineral filler material is covered with extremely small particles of a white pigment of a high refractive index, using an organic acid fixing agent to bond the pigment particles to the surfaces of the filler particles.

The filler materials contemplated by the present invention are the conventional mineral fillers, such as the different types of earth alkali metal salts, particularly calcium, magnesium and barium carbonates and sulfates, dolomites, kaolins, silica, mica, talcs, etc.

While any white pigment whose refractive index is higher than that of the filler material may be used, it is preferred to coat the filler particles with a pigment of high opacity so that a relatively small amount of pigment may suffice to cover a large amount of filler. In the selection of the pigment, it is important to choose the filler material and the pigment so that they have a mutual physico-chemical affinity, which will assure satisfactory pigment coverage. Thus, I have found that for the filler materials in commercial use, $TiO_2$ and $ZnO$, which is amphoteric, are especially suitable.

Suitable fixing agents comprise aliphatic or aromatic organic acids, including saturated higher fatty acids, such as lauric, palmitic and stearic acid; unsaturated fatty acids, including acetylene acids, such as linoleic acid, acrylic acids, such as cinnamic and oleic acid, and linolenic acid; abietic acid from rosin; alcohol acids, such as ricinoleic, lactic and tartaric acid; polybasic acids, including dibasic aliphatic acids, such as adipic and maleic acid; sulfonic acids, such as $\alpha$- or $\beta$-naphthalene sulfonic acid; phenol acids, including hydroxy benzoic acids, such as salicyclic acid; monobasic aromatic acids, including acids having the carboxyl group attached to the benzene ring directly or by means of a side chain; and dibasic aromatic acids, such as phthalic acid.

The filler material may be comminuted to any desirable particle size, such as 0.5 to 20 microns, usually not exceeding an average of about 10 microns. In commercial practice, I have found a particle size range from 5 to 7 microns suitable for the purposes of the invention. Smaller particles, averaging less than three microns, for instance, may be used but the usual crushing techniques cannot be employed to obtain such fine comminution.

The very fine pigment particles have an average diameter well below that of the filler particles, for instance 0.1 micron or less.

Effective whitening of the filler particles is obtained with 0.5% to 10% by weight of pigment, based on the filler material, 1% by weight of pigment having been found satisfactory. If substantially more than 10% of pigment is used, the product is a pigment rather than a filler.

The organic acid fixing agent is used in amounts of 0.1% to about 10%, preferably not exceeding 4–5%, based on the filler weight.

While the invention is applicable to any of the above-mentioned filler materials, it is of particular advantage in connection with calcium carbonate of the calcite type.

Hard crystalline raw materials of this type must be comminuted to a particle size of the order of one to three microns to obtain a desirable degree of hiding power. This entails considerable practical difficulties because extended crushing between metallic surfaces contaminates and darkens the white particles. Therefore, particle sizes of the order of 1–3 microns cannot be obtained without making the product grey unless very expensive apparatus, such as jet mills or fluid energy mills, are employed, which use the principle of milling the particles against themselves. Another crushing process uses wet treatment which, however, involves complex installations and high costs.

According to the present invention, the filler material may be crushed dry to a size no less than about 5 to 7 microns, which will still assure excellent filler qualities in paints, for instance, and has the added advantage of a smaller oil absorption than the smaller particles below 3 microns. The hiding power of these larger filler particles is obtained by coating them with a white pigment of high refractive index. Thus, this invention combines the advantages of a moderate and cheap crushing process with a low oil absorption of the finished filler, while its hiding power can be modified at will. Furthermore, covering the filler particles with white pigment powder results in a hiding power superior to that obtained if the same amount of pigment were added to the filler alone, i.e. without the organic acid fixing agent.

Several problems arise in permanently and uniformly fixing the pigment to the filler particle surfaces, and they have been solved according to the invention in the following manner:

(1) The pigment is chosen in the manner fully described hereinabove and, in a preferred embodiment, I use a very pure calcium carbonate filler of the calcite type with titanium dioxide (titanic acid anhydride) as the pigment. Since calcium carbonate has a slight natural alkalinity and $TiO_2$ is an acid anhydride, these substances have a physico-chemical affinity. Furthermore, the hiding power of titanium dioxide is so high that the proportion of pigment to filler may be very low. The natural affinity between $CaCO_3$ and $TiO_2$ is one of the advantages of this preferred embodiment of the invention.

(2) To assure effective surface coverage of the filler particles, there must be a considerable excess of pigment particles over filler particles and the pigment particles must be much smaller than the filler particles. For instance, I have found that the particle size of the pigment should not exceed about 0.1 micron if the filler particles have an average size of about six microns. In this case, a hiding power considerably superior to that of calcium carbonate fillers of 1–3 micron size is obtained by covering the larger particles (6 microns) with as little as 1% by weight, based on the filler, of titanium dioxide.

Calculation shows that, with the given proportion of 1% of titanium dioxide and 99% of calcium carbonate, the particle sizes being 0.1 and 6 microns, respectively, there are 1500 times as many particles in one unit of weight of pigment than in 99 weight units of filler. This shows the dense pigment coverage of the filler particles.

(3) I have found it to be most advantageous to crush the filler raw material, for instance calcite, to obtain the desired filler particle size in the presence of the organic acid fixing agent and the pre-comminuted pigment, for instance titanium dioxide powder. In this way, the filler particles can be efficiently covered with the white pigment during milling.

Preferably, the three dry ingredients are intimately mixed and crushed at an elevated temperature between about 50° C. and 250° C. The preferred upper limit of the treatment temperature is 80° C.

The elevated temperature may be obtained either by preheating the filler material to the desired temperature before charging it into the mixer. Alternatively, hot air may be blown into the treatment zone. In any event, the temperature should preferably be such that the organic acid will be brought into contact with the filler and the pigment in its liquid or gaseous phase.

Any conventional apparatus adapted to provide intimate mixing and crushing of the ingredients may be used for the purposes of the invention, including percussion crushers, mill, mixers, such as the Henschel Fluid Mixer, ball mills and like mixing and crushing apparatus.

The organic acids have a strong affinity to calcium carbonate, for instance, particularly if they are brought to the gaseous state at temperatures between about 50° C. and 80° C. Thus, the organic acid and the pigment are fixed to the surface of the filler particles simultaneously, constituting a kind of lacquering of the particles. In other words, the organic acid serves as a vehicle for the pigment and is fixed to the filler particles by absorption as well as by actual chemical reaction.

The invention will be illustrated in the following examples which, however, should not be considered as limitative of its scope:

*Example I*

One kilogram of calcite was charged into a jaw crusher after being preheated to a temperature of about 75° C. Simultaneously, a mixture of 20 g. of equal parts of titanium dioxide (0.1 micron particle size) and stearic acid was charged into the crusher. The crusher was operated (with or without interruption) until the calcite particles had an average diameter of five to seven microns. The resultant product had the following characteristics:

(1) A 15% oil absorption (by rub-out test), which makes the filler useful for obtaining brilliant paints.

(2) The hiding power or opacity was higher than that of the same calcite not treated according to the invention but reduced to a particle size of one to three microns.

*Example II*

Ten kilograms of dolomite (calcium-magnesium double carbonate) was charged into a hermetically closable ball mill with 300 g. $TiO_2$ (rutile) and 200 g. salicylic acid. Similar results were obtained with pigment amounts between 100 and 500 grams and acid amounts varying between 50 and 300 g. The mixture was brought to a temperature of about 200 to 220° C. by blowing hot air into the closed mill during the crushing operation so that the salicylic acid was vaporized. It is also possible to heat the mill walls from the outside to obtain the desired treatment temperature.

The resultant filler, crushed to a particle size of about seven microns, had very good hiding power and was eminently useful for paints.

*Example III*

The same amount of dolomite used in Example II was charged into a micro-pulverizer with 600 g. ZnO particle size: less than 1 micron) and 200 g. of lauric acid. The zinc oxide amount may be varied between about five and seven hundred grams. The mixture was crushed at a temperature of the order of 225° C. until the filler particles had an average size of three to five microns.

*Example IV*

The procedure of Example III was repeated with kaolin instead of dolomite and abietic acid instead of lauric acid. Up to about 500 g. of abietic acid gave satisfactory results. The filler was milled to an average particle size of about four microns.

*Example V*

Example IV was repeated with titanium dioxide used instead of ZnO.

I have carried out the above examples with satisfactory results with all of the acids listed hereinabove. The interchange of acids made no substantial difference in the feasibility of the process for producing white fillers. The choice of specific organic acid depends primarily on some desirable effects to be accomplished on paints or for plastics. Saturated higher fatty acids, such as stearic acid, may be used, for instance, to make thixotropic paints. On the other hand, oxalic or salicylic acid may be used if fungicidal or bactericidal properties are desired. It will accordingly be obvious that a wide range of organic acids may be found useful on the process of this invention, as illustrated by way of examples.

It will be evident to the skilled in the art that the basic procedure of the above examples may be repeated in various combinations of filler material, pigment and acid, with the specifically enumerated constituent substances set forth hereinabove. In all cases, it has been found that the hiding power of the pigment-covered filler is much superior to that which could otherwise be obtained with the same proportion of pigment.

Thus, for example, a calcite filler (particle size: five microns) treated with 1% by weight, based on the filler, of titanium dioxide (0.1 micron) in the presence of an organic acid (for instance, stearic, lauric or abietic acid) has a hiding power or opacity twice or three times that of titanium oxide, depending on the efficiency of the crushing apparatus and the particular mixture used. In other words, the treatment according to the invention accomplished the same results as would be obtained by the use of two or three times as much pigment in a simple mixture. The efficiency of covering the filler particles with the white pigment with the aid of the organic acid fixing agent is such that the same results cannot be obtained if the filler, acid and pigment were mixed with paints directly.

The present invention makes it possible to produce a white filler having all the desirable properties required in paint or plastic composition fillers. It accomplishes this result with simpler and less expensive apparatus than required for conventional micronization processes producing products of lower quality.

The filler materials obtained according to the present invention may be incorporated in paints or plastic compositions in conventional manner. They may be used for all purposes mineral fillers of this type have been used heretofore.

While the invention has been described in connection with certain preferred embodiments and illustrated in some examples, it will be clearly understood that many modifications and variations may occur to the skilled in the art, particularly after benefiting from the present teaching, without departing from the spirit and scope of the present invention as defined in the appended claims.

What is claimed is:

1. A white mineral filler consisting essentially of particles of an average diameter of about 0.5 to 20 microns of a mineral filler material having affixed thereto particles of an average diameter of no more than about 0.1 micron of a white pigment selected from the group consisting of titanium dioxide and zinc oxide in a vehicle of a normally solid organic acid, the pigment being between about 0.5 to 10% by weight and the organic acid vehicle being between about 0.1 to 10% by weight, both based on the filler material.

2. A white mineral filler consisting essentially of particles of an average diameter of about 0.5 to 20 microns of a mineral filler material selected from the group consisting of earth alkali metal salts and silicon minerals, the filler material having affixed thereto particles of an average diameter of no more than about 0.1 micron of a white pigment selected from the group consisting of titanium dioxide and zinc oxide in a vehicle of a normally solid organic acid, the pigment being between about 0.5% to 10% by weight and the organic acid vehicle being between about 0.1% and 10% by weight, both based on the filler material.

3. The white mineral filler of claim 2, wherein the filler material is calcium carbonate of the calcite type.

4. A white mineral filler consisting essentially of particles of an average diameter of about five to seven microns of a mineral filler material having affixed thereto particles of an average diameter of no more than about 0.1 micron of a white pigment selected from the group consisting of titanium dioxide and zinc oxide in a vehicle of a normally solid organic acid, the pigment being between about 0.5% and 10% by weight and the organic acid vehicle being between about 0.1% and 10% by weight, both based on the filler material.

5. Only a white filler consisting essential of particles of an average diameter of about 5-7 microns of a mineral filler material selected from the group consisting of earth alkali metal salts and silica minerals, said filler material particles having affixed to their surfaces particles of an average diameter of about 0.1 micron of a white pigment selected from the group consisting of titanium dioxide and zinc oxide in a vehicle of a normally solid organic acid, the pigment being between about 0.5% and 10% by weight, based on the filler material, and the organic acid vehicle being between about 0.1% to 10% by weight based on the filler material.

6. The white filler of claim 5, wherein neither the pigment nor the organic acid vehicle exceeds 5% by weight of the filler material.

7. The white filler of claim 5, wherein the filler material is calcium carbonate of the calcite type and the pigment is titanium dioxide.

8. A process of preparing a white mineral filler, comprising the step of crushing a mineral filler material to a particle size of about 0.5 to 20 microns and simultaneously mixing the mineral filler material with between about 0.5 to 10% by weight, based on the filler material, of smaller particles of about 0.1 micron of a white pigment selected from the group consisting of titanium dioxide and zinc oxide, and between about 0.1 to 10% by weight, based on the filler material, of a solid organic acid at a temperature sufficient to fluidize the organic acid and to spread it about the entire surface of the filler material particles, whereby the organic acid will fix the pigment particles to the surfaces of the filler material particles.

9. The process of claim 8, wherein the temperature is between 50° C. and 250° C.

10. A process of preparing a white mineral filler, comprising the steps of intimately mixing a mineral filler material, about 0.5% to 10% by weight, based on the filler material, of a white pigment selected from the group consisting of titanium dioxide and zinc oxide, said pigment having a particle size of no more than 0.1 micron and 0.1% to 10% by weight, based on the filler of a solid organic acid, and crushing the mixture at a temperature between 50° C. and 250° C. until the filler material has an average particle size of about five to seven microns.

11. The process of claim 10, wherein the filler material is selected from the group consisting of earth alkali metal salts and silica minerals.

12. The process of claim 10, wherein the filler material is calcium carbonate of the calcite type and the white pigment is titanium dioxide.

13. A white mineral filler consisting essentially of particles of an average diameter of about 0.5 to 20 microns of a mineral filler material having affixed thereto particles of an average diameter of no more than about 0.1 micron of a white pigment selected from the group consisting of titanium dioxide and zinc oxide in a vehicle of a normally solid organic acid, the pigment being between about 0.5% to 10% by weight and the organic acid vehicle being between about 0.1% to 10% by weight, both based on the filler material.

14. A process of preparing a white mineral filler, comprising the step of covering particles of an average diameter of about 0.5 to 20 microns of a mineral filler material at a temperature between 50° C. and 250° C. simultaneously with between 0.5% to 10% by weight, based on the filler material, of particles of an average diameter of no more than about 0.1 micron of a white pigment selected from the group consisting of titanium dioxide and zinc oxide, and between about 0.1% to 10% by weight, based on the filler material, of a normally solid organic acid.

References Cited in the file of this patent

UNITED STATES PATENTS

| | | |
|---|---|---|
| 2,172,997 | Edwards | Sept. 12, 1939 |
| 2,809,122 | Willis et al. | Oct. 8, 1957 |
| 2,872,335 | Bronson | Feb. 3, 1959 |